ELECTRONIC TELEPHONE SYSTEMS

Filed Feb. 20, 1951 5 Sheets-Sheet 1

INVENTOR.
ALFRED H. FAULKNER
BY
ATTORNEY

INVENTOR.
ALFRED H. FAULKNER
BY Chas. W. Cady
ATTORNEY

Nov. 6, 1956 A. H. FAULKNER 2,769,865

ELECTRONIC TELEPHONE SYSTEMS

Filed Feb. 20, 1951 5 Sheets-Sheet 3

*INVENTOR.*
ALFRED H. FAULKNER

*BY* [signature]

ATTORNEY

ELECTRONIC TELEPHONE SYSTEMS

FIG. 4 DISTRIBUTOR 27

INVENTOR.
ALFRED H. FAULKNER

BY [signature]

ATTORNEY

INVENTOR.
ALFRED H. FAULKNER
BY
ATTORNEY 2,769,865

ELECTRONIC TELEPHONE SYSTEMS

Alfred H. Faulkner, Chicago, Ill., assignor to Automatic Electric Laboratories, Inc., Chicago, Ill., a corporation of Delaware Application February 20, 1951, Serial No. 211,950

40 Claims. (Cl. 179—18)

This invention relates in general to electronic telephone systems, and more particularly to the establishing of connections therefor by means of electronic circuits.

Telephone systems generally are composed of mechanical switches, which are operably controlled by electrical relay circuits. The mechanical movements in the switch train cause a delay of time in completing the cascade arrangement in telephone systems. For providing connections between the mechanical switches, bank contacts are required, which are not permanent connections and which are subject to the accumulation of foreign matter thereon, thereby hindering satisfactory connections between the switches.

Electronic telephone systems have been proposed to overcome the above-mentioned problems, but, in general, these systems operate above the conventional telephone and voice frequencies, and require sustained oscillations. Therefore, such systems require radio communication type circuits, such as oscillators and phase shifters, which are intricate, costly, and difficult to maintain.

Accordingly, an important object of the present invention is to provide an electronic telephone system that does not require sustained oscillations or high frequency currents.

Another object of the present invention is to provide a simplified electronic telephone system that is economical to manufacture, sturdy and durable in operation, and can be maintained with facility.

Another object of the present invention is to provide an electronic telephone system having an electron tube matrix for establishing conversational paths between the calling and called parties.

Another object of the present invention is to provide an electronic distributor for pre-selecting idle selectors in succession.

Another object of the present invention is to provide selectors having electronic means therein to count and store dial pulses.

Another object of the present invention is to provide an electron tube matrix for establishing connections between the subscribers lines and selector units.

Another object of the present invention is to provide an electron tube matrix for establishing connections between several circuits through the tubes of the matrix.

Another object of the present invention is to provide circuit means for counting and storing dial pulses in binary sequence and subsequently converting the stored binary pulses into decimal equivalents.

Another object of the present invention is to provide an electron tube matrix operating entirely by direct current voltages to establish a connection between several circuits.

Other objects will appear upon further perusal of the detailed description taken in conjunction with the accompanying drawings, which show a preferred embodiment of the present invention.

Figure 1:
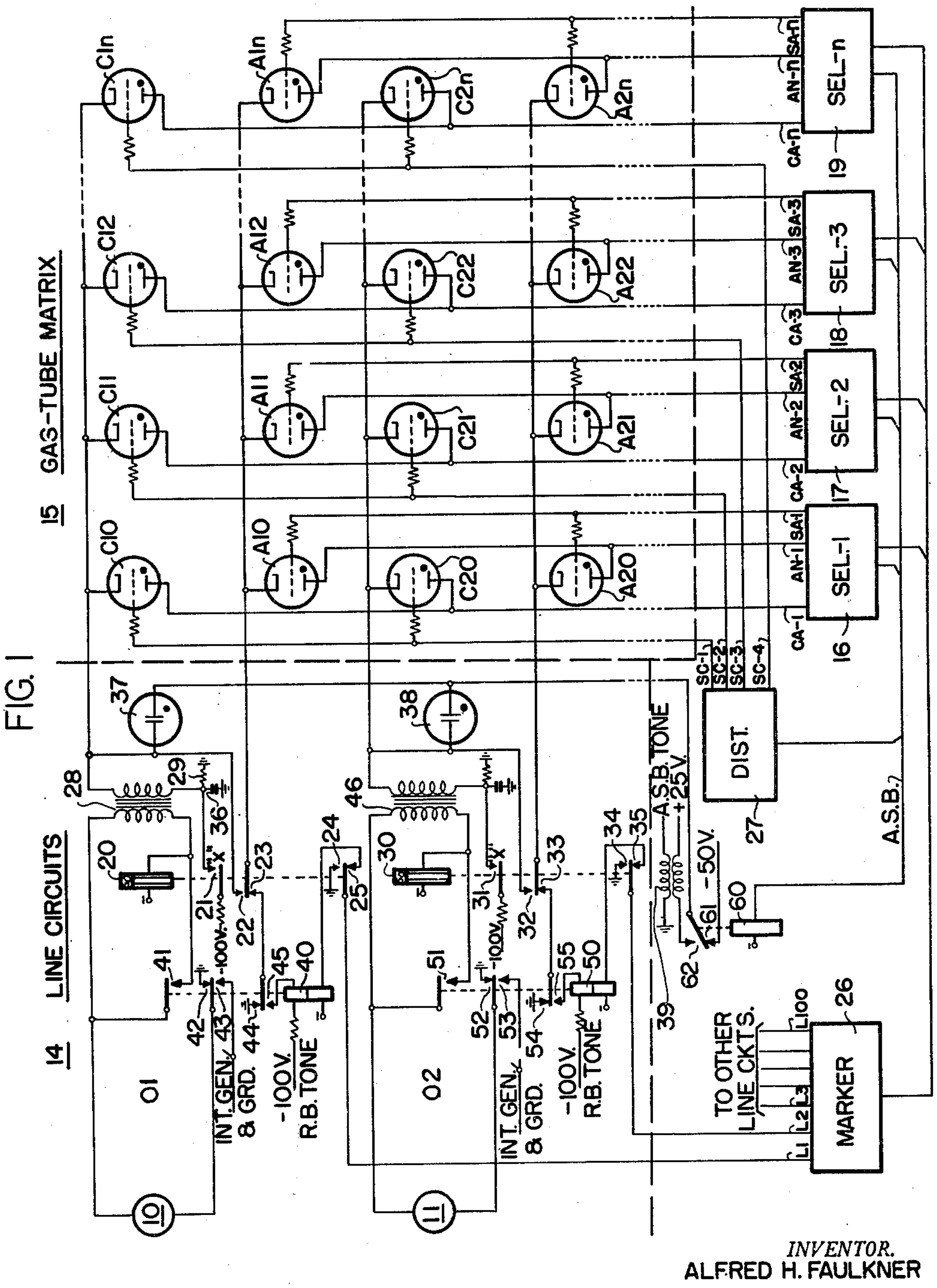
Figure 1 is a schematic diagram of an electronic telephone system embodying the present invention, and particularly illustrating a gas-tube matrix for extending connections to and from the line circuits.

Referring to Figure 1, an electronic telephone system is herein shown in its preferred embodiment, and may be adapted for use in a one-hundred line telephone exchange. The electronic telephone system comprises a plurality of substation sets, such as substation sets 10 and 11, which are conventional type substation instruments. However, for more satisfactory operation, it is preferred that the dial springs of the substation sets be shunted by a resistor to avoid undue drops in current through the line relays 20 and 30 during impulsing, as it is intended that the line relays 20 and 30 of the calling and called parties remain operated for the duration of a call.

Line circuits 14, where for the purpose of simplicity, only two lines are shown, are extended from the telephone substation sets 10 and 11 to a group of electron tubes, such as cold cathode type gas-tubes, which form a matrix 15 or a coordinate array of gas-tubes having rows and columns. Using gas-tubes of the cold cathode type conserves power, since there is no dissipation of energy in the heating elements. Further, the arrangement herein provided operates entirely on D. C. voltages. The actual direct current voltages shown and described in the drawings and the following specification are for purposes of explanation only. It is to be understood that these values are dependent upon the characteristics of the specific types of cold cathode tubes used. The present embodiment makes use of tubes having electrical characteristics similar to the type OA4G. The gas-tube matrix 15 is directly connected to a group of electronic selectors 16, 17, 18 and 19, thereby eliminating the mechanical switches for establishing connections from the calling and called lines. Matrix 15 also establishes conversational paths between the calling and called lines. It is to be noted that the connections and conversational paths are established through the gas-tubes of the matrix 15.

The gas-tube matrix 15 in the preferred embodiment comprises a group or row of calling tubes, such as C10, C11, C12 and **C1*n* which are individually associated with the first line for extending a call, and each tube is individually associated with a particular selector. The first line, having substation 10 thereon, will be designated line 01, while the line having substation 11 thereon will be designated line 02. By way of example, C10 is associated with selector 16 and C11 is associated with selector 17. Another group or row of gas-tubes A10, A11, A12 and A1N are associated with line 01 for receiving a call, and each tube is individually associated with a particular selector. Similarly, line 02 has associated therewith a group or row of calling tubes C20, C21, C22 and C2N, and a group or row of answer tubes such as A20, A21, A22 and A2N**.

Assume that the subscriber on line 01 calls the subscriber on line 02. In so doing, the loop over line 01 closes to energize the line relay 20 over the following path: ground, contacts 42, substation 10, transformer 28, relay 20 and battery. Relay 20 operates to close contacts 21, thereby placing —100 volts on the cathodes of tubes C10, C11, C12 and C1N through the resistor in the battery lead and the RC circuit 29 and 36. Contacts 22 close to prevent the answer tubes A10, A11, A12 and A1N from operating. Contacts 24 close to ground the marker 26 to indicate that line 01 is busy.

For establishing connections from the line circuits 14 to an idle selector of the group of selectors 16, 17, 18 and 19, a distributor 27 is herein provided which pre-selects in successive order an idle selector of the aforementioned group, as well as conditions the column of gas-tubes of matrix 15 associated with the pre-selected idle selector for operation by applying an operating potential to the starter-anodes thereof.

Figure 4:
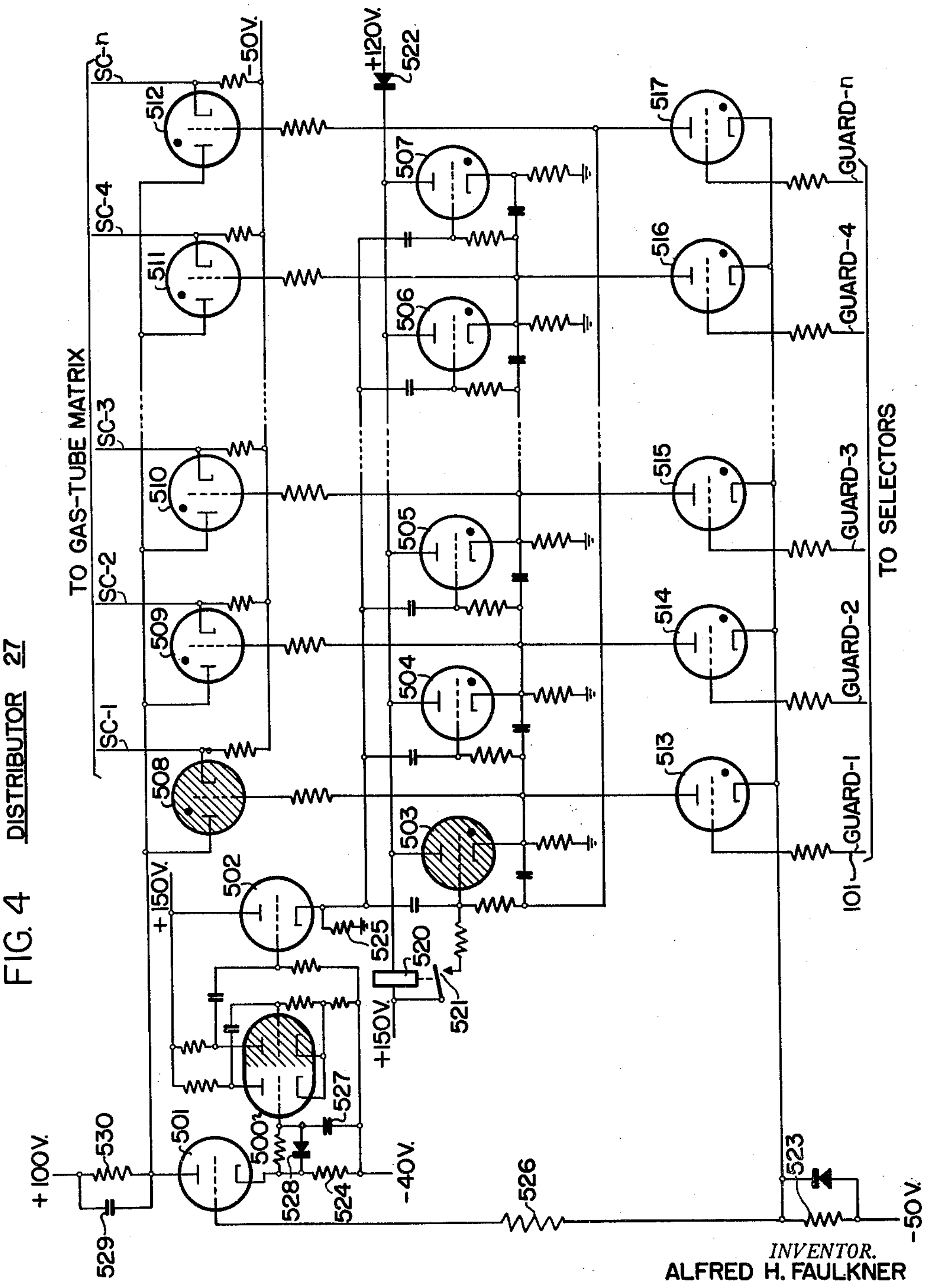
Figure 4 is a schematic diagram of an electronic distributor.

The distributor 27, shown in block diagram in Figure 1 and in detail in Figure 4, comprises a group of selector testing circuits having therein suitable tubes, such as gas-tubes 513 and 517. Each selector testing circuit has one tube therein, which is individual to a particular selector.

In order to provide a sequential operation for the distributor 27, a ring counting chain or circuit is herein provided having suitable tubes, such as gas-tubes 503—507. The ring counting circuit, operating in a sequential manner, operates only one tube at a time for conditioning one of the selector testing circuits at a time. When the conditioned selector testing circuit encounters a busy selector, it operates a pulsing or control circuit having vacuum tubes 500—502. The operation of the pulsing circuit transmits a pulse to the ring counting chain causing the succeeding tube of the ring counting chain to fire, thereby preparing the succeeding selector testing circuit for operation. The selector testing circuits operate in succession until an idle selector is encountered.

Another series of gas-tubes 508—512 form an outgoing circuit, which is arranged to mark leads SC–1 to SC–N according to the condition of a ring counting chain for preparing the gas-tubes of matrix 15 associated with the pre-selected idle selector for operation.

In a ring counting circuit of the type shown some starting means is required to fire one of the tubes before counting can commence. In the present instance, relay 520 serves to start the chain. When power is applied to the distributor 27, a potential source is extended from the back contacts 521 on relay 520 to the starter-anode of tube 503, causing it to strike. The anode current of tube 503 energizes relay 520 causing it to operate. Contacts 521 break to open the starter circuit. Rectifier 522 prevents the anode potential from falling below positive 120 volts in subsequent circuit operations.

When tube 503 strikes, its cathode potential rises to a positive 50 volts, since there is a 70 volt drop across the tube. This 50 volt potential is impressed on the starter anode lead of gas-tube 508 causing it to strike and raise the potential on the SC–1 lead from —50 volts to a positive 25 volts. All other SC leads remain at a potential of —50 volts. The 50-volt potential on the cathode of tube 503 prepares the tube 513 for operation.

When selector 16, the first selector in successive order, is seized or busy, a potential on guard lead 101, indicating busy, is adequate to trigger gas-tube 513, since tube 503 is operating, causing its cathode potential to increase from —50 volts to a —30 volts. Tube 513 can only strike when tube 503 is operating, since the anode potential on tube 513 is controlled by a current flow through the cathode resistor of tube 503. A 20 volt change across resistor 523, which is in the cathode circuit of tube 513, causes tube 501 to become conductive, thereby dropping the voltage on the anode of tube 508 to approximately ground voltage. Tube 508 is thus extinguished and causes the potential on lead SC–1 to drop to —50 volts.

Conduction in the tube 501 also produces a positive pulse across resistor 524. This positive pulse is impressed on the grid of the left triode of tube 500 through an RC filter. The purpose of this filter is to delay advancement of the counting chain until the potential on the anode of tubes 508—512 has fallen below the extinction point, thereby precluding interference with busy circuits during advancement of the counting chain.

A multivibrator circuit, having the tube 500 operates in a conventional manner. When one triode of the pair conducts, it renders the other tube non-conducting. The right triode of tube 500 is rendered non-conductive by the operation of the left triode, when the positive pulse is impressed on the grid thereof causing tube 502 to operate to generate a short positive pulse across the resistor 525 of its cathode circuit. Each pulse across the resistor 525 advances the ring counting chain one step in a well known manner. The firing of one tube places the pre-firing bias on the succeeding tube by means of the voltage drop across the cathode resistor of the one tube. Therefore, when tube 503 fires, it lowers the amount of voltage needed on the starter-anode of only tube 504, so that the positive pulse fires only tube 504. When tube 504 strikes, it extinguishes tube 503 by increasing the cathode voltage on tube 503 by means of a discharge of the condenser connected from the cathode of tube 504 to the cathode of tube 503, so that the tube 503 cannot maintain ionization. As the cathode of tube 503 returns to ground potential, tube 513 is extinguished and tube 514 strikes, if the second selector is busy.

Assuming that the third selector is idle, tube 515 does not strike when tube 505 becomes ionized. Hence, when tube 514 is extinguished, the junction of resistors 523 and 526 returns to a —50 volts, thereby cutting off the plate current in tube 501. Condenser 527 is quickly discharged through rectifier 528 and resistor 524 to stop the advancement of the counting chain. Condenser 529 discharges more slowly through resistor 530, until tube 510 is able to strike. The time constant of condenser 529 and resistor 530 determines the minimum delay between the removal of the positive enabling potention on an SC lead, and the restoration of this enabling voltage on another SC lead.

Seizure of the idle selector by a line circuit is accomplished when a column of gas-tubes of the matrix 15 associated with the idle selector is prepared for operation by the distributor 27 and the pre-selected idle selector, and subsequent thereto the line circuit impresses a potential on the cathode of the gas-tubes of matrix 15 in the row associated therewith.

Therefore, the tube of matrix 15 that is capable of firing for seizure therethrough to the pre-selected idle selector is the tube in the column associated with the pre-selected idle selector and in the row associated with the operated line circuit.

Figure 2:
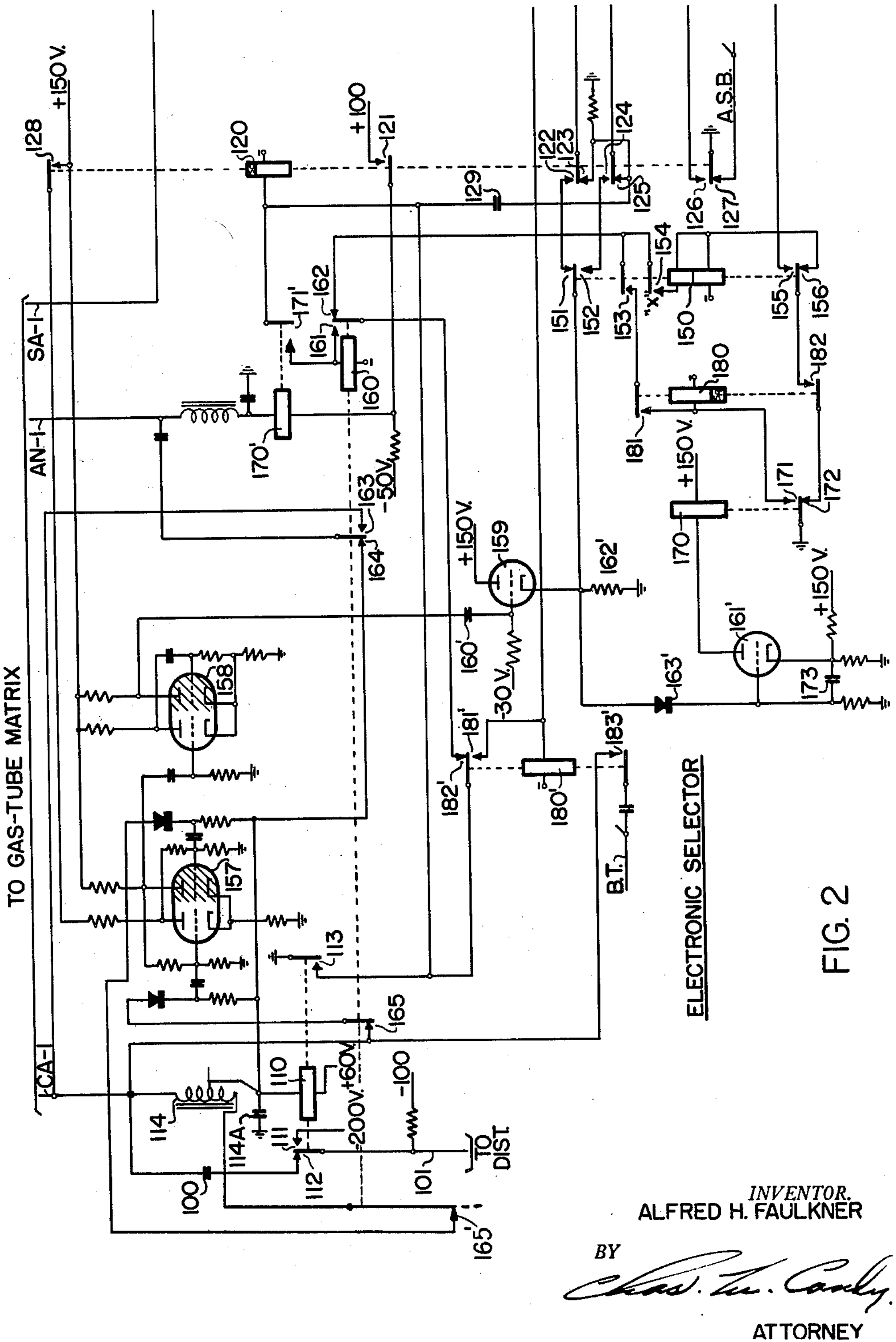
Figures 2 and 3 are schematic diagrams of the electronic selector.
Figure 3:
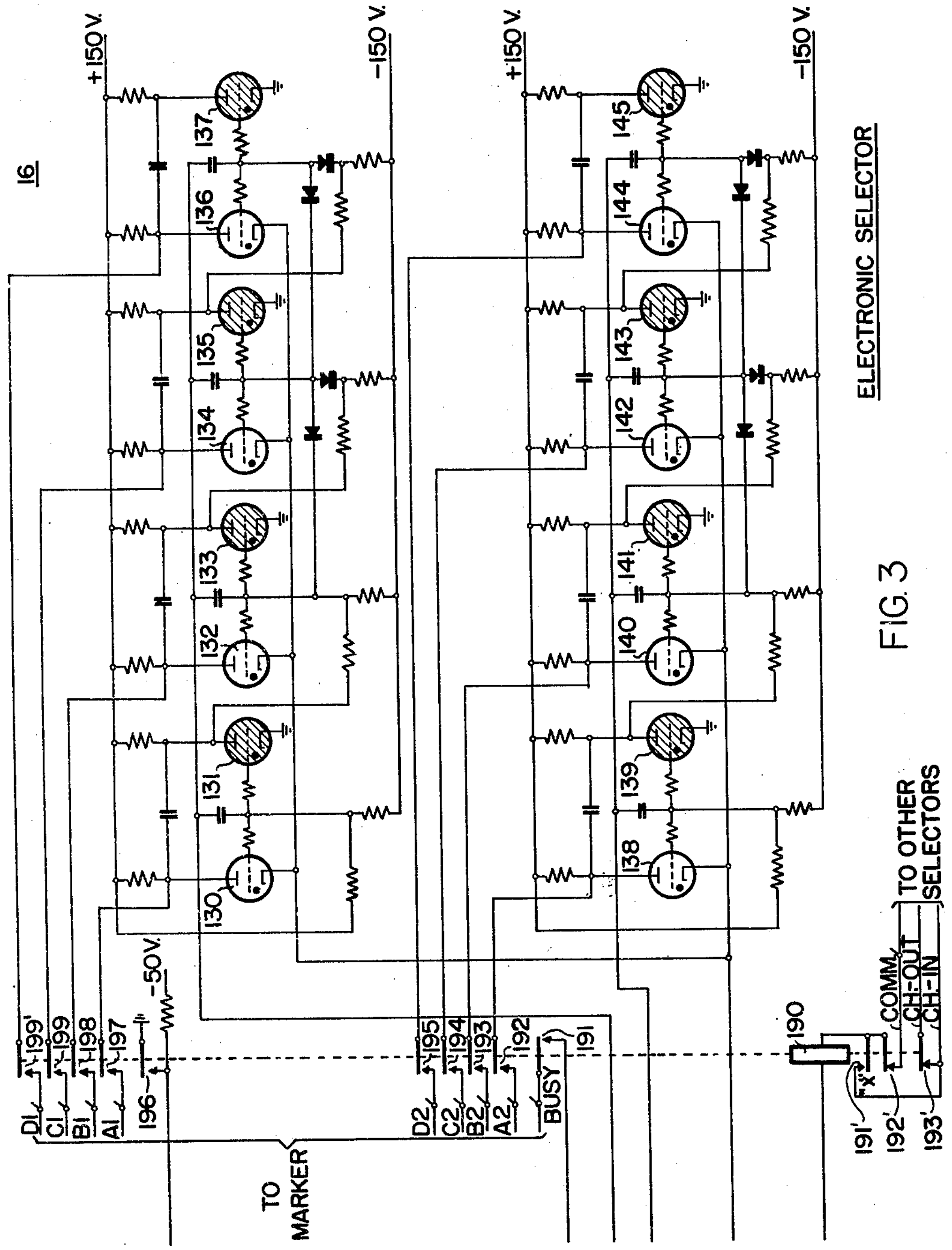

In the event that an idle selector is available, such as selector 16 which is shown in block diagram in Fig. 1 and in detail in Figs. 2 and 3, a positive 60 volt potential is impressed on the plate of the gas-tubes associated therewith, such as tube C–10, over the following path: CA–1 lead, choke coil 114, relay 110 and +60 volt battery. When relay 20 of line circuit 01 operated, tube C–10 of gas-tube matrix 15 strikes, when in the transient condition its cathode potential is reduced to a —65 volts.

The transition of the discharge to the anode of tube C–10 causes the potential of lead CA–1 to drop from +60 volts to +5 volts due to a 70 volt drop in the main gap of tube C–20. The suddent change in potential on lead CA–1 causes the distributor 27 to reduce the potential of lead SC–1 to from +25 volts to —50 volts, and the distributor 27 then advances to the next idle selector. After a suitable delay, the distributor 27 raises the potential on the SC lead of the next idle selector from a —50 to positive 25 volts. Before this enabling potential is applied to an SC lead, the cathode potential of tube C10 will be increased to approximately —30 volts. Hence, application of a +25 volts to an SC lead, such as SC–2, does not cause the corresponding tube C11 to strike.

Dial tone is not required in the present invention, since there is practically no delay in connecting a calling line to an idle line selector.

The operated line circuit transmits a series of dial pulses that contains an A. C. component of rectangular wave form, except as modified by line distortion. The fundamental frequency of the A. C. component is normally ten cycles per second, but with the present system the value can be raised.

The lower secondary terminal of transformer 28 is maintained at ground potential for A. C. signals by means such as a by-pass condenser 36. The center tap of coupling choke 114 in the selector 16 is maintained at a ground potential for A. C. signals by means such as a by-pass condenser 114A. The upper secondary terminal of transformer 28 and the upper terminal of choke coil 114 of selector 16 are connected to the cathode and anode of tube C10, respectively. As the voltage across the ionized gas-tube C10 varies to only a slight degree with variations in current, signals appearing across the secondary of transformer 28 are accurately transmitted to and from the selector 16.

To avoid using an unduly large line transformer for transformer 28, the impulse responding apparatus in the selector 16 is arranged to respond to the higher frequency components in the impulse wave.

When the fundamental frequency of the impulse wave is considerably below the lowest frequency, which can be transmitted through the line transformer, a short pulse of one polarity appears across the secondary winding of transformer 28 at the start of each impulse and a short pulse of the opposite polarity appears at the end of each pulse.

Referring now to Figures 2 and 3, as previously described, seizure is accomplished by establishing a circuit through the gas-tube matrix 15 to the CA lead of the chosen selector. The consequent drop is transmitted through condenser 100 to a guard lead 101 in the distributor 27. After a brief delay, relay 110 of the selector 16 is energized through the CA lead and the choke coil 114.

Relay 110 in operating closes contacts 111 to transfer the guard lead 101 to a —200 volt battery to mark the selector busy for the duration of the call. Further, contacts 113 close to energize slow-to-operate relay 120 over the following path: ground, contacts 113, relay 120, and battery. Relay 120 being a slow-to-operate relay permits the ground on contacts 113 to transmit a positive pulse through a coupling condenser to the impulsing lead of the counting circuit before the transfer operation of contacts 122, 123, 124 and 125 takes place.

The counting circuit shown in Figure 3 comprises a first and second counting chain. The first counting chain comprises a plurality of flip-flop type circuits that have a binary sequential operation. Each flip-flop circuit comprises a pair of tubes such as gas-tubes 130 and 131. In the conventional manner one tube of a pair can conduct at a time. The conduction of one tube renders the other tube of a pair non-conducting.

In a similar manner the remaining pairs of gas-tubes, such as tubes 132, 133; 134, 135; 136, 137 are connected in a conventional flip-flop manner. The binary sequential operation is provided by suitable connections between the flip-flop circuits. In a similar manner the second counting chain comprises interconnected flip-flop circuits to provide a binary sequential operation. The flip-flop circuits are formed by pairs of gas-tubes such as tubes 138, 139; 140, 141; 142, 143 and 144, 145.

The cathode circuits of the left tube of each pair are open at this time, and therefore non-conducting. The right tube of each pair are assumed to be conducting. The particular tubes that will be conducting will depend upon the previous operations of the selector.

The positive pulse transmitted initially by the ground on contacts 113 to the impulsing lead causes all of the right triodes of each pair in the counting circuit to conduct, thus preparing the counting chains for operation.

When relay 120 operated, the cathode circuits of the left triodes of each pair are completed by the closing of contacts 126. Further, the impulsing leads are transferred to the contacts of relay 150 by the closing of contacts 122 and 124. To prepare for subsequent circuit operations, contacts 128 close to apply 150 volt plate voltage to the left triode of pulse repeater circuit tube 157 and contacts 121 close to apply 100 volts to the AN–1 lead through relay 170'.

The two sections of the pulse repeating circuit, tube 157, are connected in a conventional flip-flop circuit. The flip-flop circuit comprising tube 157 is coupled through rectifiers and RC circuits in such a manner that a positive pulse on lead CA–1 causes the left triode to conduct and thereby renders the right triode non-conducting, and a succeeding negative pulse causes the right triode to conduct, thereby rendering the left triode non-conductive.

As previously noted, the dial pulses transmitted over the calling line each produce a pulse of one polarity across the secondary of line transformer 28 at the start of each impulse and produce a pulse of the opposite polarity at the end of each impulse. The line transformer 28 is poled to drive lead CA–1 positive at the start, and negative at the end of each impulse. Thus a series of impulses causes the state of tube 157 to be reversed and returned to normal a number of times corresponding to the number of impulses in the series.

Each time the tube 157 changes conduction from the right triode to the left triode, a short positive pulse with an expotential decay is delivered to the left triode of pulse-shaping circuit, tube 158, through an RC circuit having a short time constant. Tube 158 is connected in a pulse-shaping circuit manner, and is arranged to deliver a short rectangular pulse to the grid of pulsing tube 159 through coupling condenser 160' for each input pulse. Pulsing tube 159 is used as a cathode follower to reproduce the rectangular pulse across a relatively low value resistor 162' in its cathode circuit. Resistor 162' is connected to the impulse leads through the contacts 151 of relay 150. Since relay 120 is operated, the first series of impulses are extended only to the first counting chain through contacts 123.

The first counting chain operates in a binary sequential manner so as to advance one count for each pulse in a binary sequence. Tubes 130 and 131 change conduction for each pulse; tubes 132 and 133 change conduction with every second pulse and tubes 134 and 135 change conduction with every fourth pulse, etc.

The positive pulses appearing across the resistor 162' in the cathode circuit of tube 159 are impressed on the grid of transfer circuit tube 161' through the rectifier 163' to render tube 161' conductive thereby energizing relay 170. A condenser 173 is provided in the grid circuit of tube 161' to maintain conduction in the tube between impulses. Following a series of impulses, the charge on condenser 173 gradually decays, causing relay 170 to restore.

Relay 170 operates and contacts 171 close to energize relay 180. Relay 180 operates and contacts 181 prepare a locking circuit for relay 180 and contacts 182 prepare an operating circuit for relay 150. After the first series of pulses, relay 170 releases and contacts 172 close to energize the lower winding of the two-step relay 150 over the following path: battery, relay 150, contacts 156, contacts 182, contacts 172 and ground. "X" contacts 154 close to energize a second operating circuit for relay 150 over the following path: battery, relay 150, contacts 154, contacts 162, contacts 182', contacts 113 and ground.

Relay 150 fully operates and transfers the pulsing resistor 162' in the cathode circuit of tube 159 from the first counting chain to the second counting chain by closing contacts 152 and breaking contacts 151. Contacts 153 prepare a locking circuit for relay 180 and contacts 155 prepare a circuit to energize relay 190. Relay 120 is still operated so that the pulsing circuit is now through contacts 124. Relay 180 releases a short time after relay 170 released.

The second counting chain is operated during the second series of pulses and operates in a manner similar to that described for the operation of the first counting chain. Therefore tubes 138, 139 change with every pulse; tubes 140, 141 change with every second pulse; and tubes 142 and 143 change with every fourth pulse in a binary sequence.

Relays 170 and 180 operate again in a manner previously described. At the completion of the second series of impulses, relay 170 restores and relay 180 locks over the following path: battery, relay 180, contacts 181, contacts 153, contacts 162, contacts 182′, contacts 113 and ground.

After relay 170 restores, contacts 172 close to energize relay 190 over the following path: ground, contacts 172, 182, contacts 155, relay 190, through a contact chain of corresponding relays in other selectors, and battery through a relay 200 in the marker 26. The contact chain is a well-known one-at-a-time circuit. If none of the corresponding relays in the other selectors are operated, relay 190 operates and contacts 191 close to connect a busy lead to the marker 26. All of the leads such as A1—D1 and A2—D2 extending to the marker 26 are connected to the counting chains by the closing of contacts 192—199′. The operated tubes in the first counting chain represents the tens digit of a called party, and similarly the operated tubes in the second counting chain represents the units digit of a called party.

In the event that all electronic selectors are busy, relay 120 of selector 16 and relays similar to relay 120 in the remaining selectors will be operated, thereby opening contacts 127 and similar contacts in the remaining selectors to release normally operated all-selector busy relay 60, as shown in Figure 1. Relay 60 releases and contacts 62 close and contacts 61 open, thereby causing the potential on the commoned electrodes of the busy gas diodes, such as gas-tube diodes 37 and 38 to be switched from −50 volts to a +25 volts. Since relay 20 is operated, a transient voltage of approximately −60 volts is applied to the left electrode of tube 37 over the following path: battery, contacts 21, RC circuit 36, 29, transformer 28 and tube 37, thereby causing only tube 37 to strike. The striking of tube 37 connects line 01 to a common all-selector-busy tone by way of transformer 39 and the loop circuit of line 01. Therefore, the all-selector-busy signal is returned to the calling subscriber, and when the subscriber on line 01 replaces the handset, line relay 20 releases by way of the discontinuity of the line loop, thereby causing the diode 37 to extinguish, when contacts 21 break.

Figure 5:
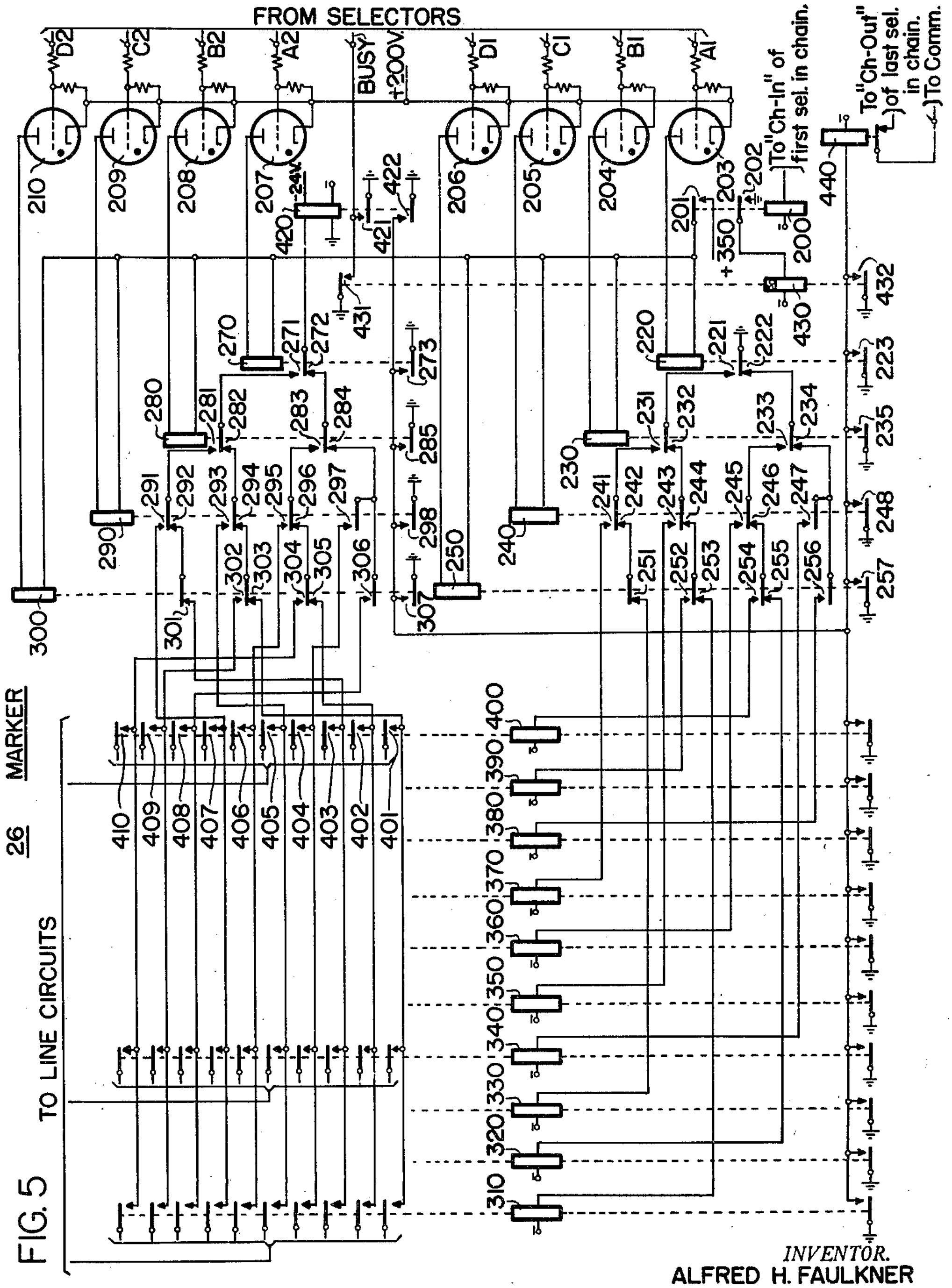
Figure 5 is a schematic diagram of a marker circuit.

Referring now to Figure 5 for the operation of the marker 26. Upon the receipt of two series of impulses, selector 16 seizes the marker 26 through corresponding leads shown in Figures 3 and 5. Relay 200 of the marker 26 is energized over the following path: battery, relay 200, CH-in lead, contacts 191′, relay 190, contacts 155, contacts 182, contacts 172 and ground.

Relay 200 operates and contacts 201 close to place anode voltage on the marker gas-filled tubes 203—210 through their associated digit converting relays 220—300.

The tubes 203—210 have their starter-anodes connected to the counting chains of Figure 3, through leads A1—D1 and A2—D2. Therefore, the tubes 203—210 that are connected to the ionized tubes of the counting chains of the selector 16, shown in Figure 3, will strike, since such starter-anodes are 130 volts negative with respect to the cathodes. The starter-anodes which extend to extinguished ones of the counting tubes in selector 16 are only 50 volts negative with respect to the cathodes, which is insufficient to initiate ionization in these tubes.

Digit converting relays 270—300 are operated in accordance with the binary equivalent of the units digit in the called number as registered in the second counting chain and relays 220—250 are operated in accordance with the tens digit in the called number as registered in the first counting chain. These relays convert the binary codes into the decimal equivalents. Relays 310—400 represent the decimal equivalent of the tens digits of the called number and are operated in accordance with the operated relays of the group of relays 220—250 to select the corresponding tens group of the leads L1—L100 leading to the line circuits. Relay 310 represents the tens digit 1; relay 320 represents the tens digit 2; relay 330 represents the tens digit 3; etc.

In the present instance, the called number is 02; therefore the tubes 132 and 136 of Figure 3 are conducting, and consequently tubes 204 and 206 of Figure 5 are conducting. Relay 230 in series with tube 204 is energized over the following path: 350 v. battery, contacts 201, relay 230, tube 204 and 200 v. to battery. Relay 250 in series with tube 206 operates over the following path: 350 v. battery, contacts 201, relay 250, tube 206, and 200 v. battery. Contacts 233 close and contacts 254 close to complete an energizing circuit to "0" tens digit relay 400 over the following path: battery, relay 400, contacts 254, contacts 246, contacts 233, contacts 222 and ground. It is to be noted that there is no other completed circuit for operating any of the other tens digit relays.

For effecting the units digit, tube 140 of Figure 3 is conducting and consequently tube 208 of Figure 5 is conducting. Relay 280 in series with tube 208 operates over the following path: 350 v. battery, contacts 201, relay 280, tube 208, and 200 v. battery.

The relays 270—300 control the marking of the units digit of the called party. When relay 400 operated contacts 401—410 closed. With relay 280 operated, contacts 281—285 close and line 02 of the line circuits is marked over the following path: contacts 402, contacts 305, contacts 296, contacts 283, contacts 272, relay 420 and battery.

The upper winding of relay 420 is therefore connected to lead L2 of Figure 1, which extends to battery through relay 50 of Figure 1, if the line is idle. If line 02 is busy, relay 420 is connected to ground by contacts 34 of Figure 1. The direction of current flow through the upper winding of relay 420 is determined by whether line 02 is busy or idle.

If line 02 is busy, relay 420 operates and contacts 421 close to ground the busy lead extending to selector 16. Relay 180′ of the selector in Figure 2 is energized over the following path: battery, relay 180′, contacts 191, busy lead, contacts 421 and ground.

Relay 180′ operates and contacts 181′ complete a locking circuit by way of contacts 113 to ground. Contacts 183′ close to place a busy tone to lead CA-1 to notify the calling subscriber of the busy condition. Contacts 182′ break to release relay 180 over a previously described path. Relay 180 restores and contacts 182 break to release relay 190 of the selector 16, Figure 3, and relay 200 of the marker, Figure 5, over a previously described path. The releasing of relays 190 and 200 frees the marker 26 for other calls.

In the event that line 02 has been previously placed in the ringing condition by another selector, and the call has not been answered, relay 420 of the marker will not operate and selector 16 will not be connected to line 02 because of the previously established connection. Under these conditions relay 200 being operated closes contacts 202 to energize slow-to-operate relay 430. After a brief delay, relay 430 operates and contacts 431 close to operate the busy relay 180′ in a manner previously described, thereby sending busy tone to the calling party and releasing the marker 26 in a manner previously described.

When the selector releases the marker 26, relay 200 restores, and contacts 201 open to remove the anode supply to tubes 203—210, thereby extinguishing any ionized tube. Relay 440 remains operated until all other relays have restored to insure complete restoration of marker 26 before seizure by another selector is permitted. It is to be noted that any operated relay places a ground connection on the operating circuit of relay 440. When relay 440 restores, it completes the one-at-a-time chain circuit, enabling the marker 26 to be seized.

In the event that line 02 is idle, relay 420 does not operate, but ringing relay 50, Figure 1, is energized in series with relay 420 over the following path: battery, relay 50, contacts 35, L2, contacts 402, contacts 305, contacts 296, contacts 283, contacts 272, upper winding of relay 420 and −24 volt battery to ground.

Ringing relay 50 operates contacts 55, thereby placing −100 v. on the cathodes of answer gas-tubes A20, A21, A22 and A2*n* over contacts 33. Whenever a selector is connected to the marker 26, the potential on the corresponding SA lead is changed from a −50 volts to a ground potential at contacts 196, hence lead SA–1 is at ground potential and leads SA–2 to SA–*n* are at −50 volts. The 100 volt difference in potential between the cathode and starter-anode of tube A20 causes the tube A20 to strike, thereby completing a holding circuit for relay 50 by way of contacts 33 and 55, lead AN–1 to a −50 volts. After the tube A–20 has fired, its cathode potential changes to approximately +10 volts by reason of the voltage drop across the resistance in its anode and cathode circuits.

Relay 50 in operating short circuited a line transformer 46 by way of contacts 51 and transferred the "+" terminal of line 02 from direct ground to ground through the interrupted generator by way of contacts 53. Ringing current is now transmitted to the called party over the following path: ground, ringing generator, contacts 53, and substation set 11, contacts 51, relay 30 and battery.

Relay 170′ of the selector 16, Figure 2, is energized in series with tube A20 and relay 50 over the following path: battery, relay 170′, lead AN–1, tube A20, contacts 33, contacts 55, relay 50 and −100 v. battery.

Relay 170′ operates and contacts 171′ close to energize a slave relay 160 over the following path: battery, relay 160, contacts 171′, contacts 113 and ground. Relay 160 operates and contacts 161 close to complete a holding circuit over the following path: battery, relay 160, contacts 161, contacts 182′, contacts 113 and ground. Contacts 165 and 165′ break to open the input circuits to tube 157. Contacts 163 close to connect lead AN–1 to lead CA–1 through a coupling condenser to establish a transmission circuit for the calling and called lines. Contacts 162 break to open the previously described locking circuits to relay 150 and 180 thereby releasing relays 150 and 180.

Relay 150 releases and contacts 155 break to release relay 190 over a previously described path. Relay 190 releasing frees the marker 26. The restoration of relay 190 causes the potential on lead SA–1 to return to −50 volts by opening contacts 196, thereby preventing any of the tubes other than tube A20 in the gas-tube matrix associated with selector 16 from striking when other calls are answered.

Ringback tone is superimposed on the −100 volt supply leading to relay 50. This tone is transmitted to the calling party over the following path: relay 50, contacts 55, contacts 33, tube A20, lead AN–1, coupling condenser in selector 16, contacts 163, lead CA–1, tube C10, transformer 28 and loop circuit of line 01. In case the called party fails to answer, tube A20 extinguishes when the calling party restores the handset, thereby releasing relay 50. If the called party answers, line relay 30 operates over the following path: ringing generator, contacts 53, substation 11, contacts 51, relay 30 and battery. The short circuit provided by contacts 51 to short out the primary of transformer 46 prevents the ringing voltage from appearing in the gas-tube matrix.

Relay 30 operates to transfer the cathodes of tubes A20, A21, A22 and A2*n* from relay 50 to the line transformer 46. The previously established circuit through tube A20 prevents the cathodes of tubes C20, C21, C22 and C27 from falling below −30 volts, thereby preventing seizure of another selector. Relay 30 in operating grounds the L2 lead to mark line 02 as busy by closing contacts 34 and restores the relay 50 by breaking contacts 35.

Relay 50 restores and removes the short-circuit established by contacts 51 across the primary winding of transformer 46. A two-way communication channel is now established between lines 01 and 02 over the following path; transformer 28, tube C10, coupling condenser in selector 16, tube A20 and transformer 46.

If the called party restores the handset first, relay 30 restores to transfer the cathode of tube A20 from the transformer 46 to ground. When the calling party replaces the handset, relay 20 restores to extinguish tubes C10 and A20. Selector 16 is released and changes the potential on its guard lead so that the selector 16 may be assigned to another call by the distributor 27. In case the called party does not replace the handset first, the called line circuit remains connected to the idle selector, when the calling party disconnects. The selector 16 is released when the called party replaces the handset.

It is to be understood that variations and modifications may be effected without departing from the scope of the appended claims.

What is claimed is:

1. In combination, an electron tube matrix, a group of first circuits, each of said first circuits individually associated with a column of tubes of said matrix, a sequentially operating circuit, means operated by said sequentially operating circuit for selecting only one of said first circuits and preparing only the tubes associated therewith for operation, and second circuits, each of said second circuits individually associated with a row of tubes of said matrix, means operated on completion of one of said second circuits for operating a prepared tube of said matrix in the row associated with said second circuit and in the column associated with said selected first circuit for extending a connection to said first circuit.

2. In a communication circuit, a gas-tube matrix, a group of selectors, each of said selectors individually associated with a column of tubes of said matrix, a distributor for pre-selecting an idle selector, means operated by said selected idle selector and said distributor for preparing the tubes associated with said idle selector for operation, and line circuits, each of said line circuits individually associated with a row of tubes of said matrix, means operated by a completed one of said line circuits for operating a tube of said matrix in the row associated with said line circuit and in the column associated with said idle selector for extending a connection thereto.

3. In a communication system, a plurality of lines, a series of selectors common thereto for extending connections therefrom, a series of groups of electron tubes, one group for each line and one tube in each group corresponding to one of said selectors, means operated on completion of one of said lines for activating a predetermined one of the tubes in its group to extend a connection to an idle one of said selectors, and means thereafter operated over said one line for operating said selector to further extend said connection.

4. In combination, a first group of circuits, a second group of circuits, an electronic circuit for connecting one of said first group of circuits to one of said second group of circuits comprising a plurality of electron tubes arranged in coordinate array in which the tubes of each row are associated with an individual circuit of said first group and in which the tubes of each column are associated with and individual to a circuit of said second group, means operated by a circuit of said second group for preparing the column of tubes associated therewith for operation, and means operated on completion of said one circuit of said first group for operating one tube of the row associated with said one circuit of said first group and in said associated prepared column of tubes to extend a connection through said one operated tube to said one circuit of said second group.

5. In a communication system, a plurality of line circuits, a plurality of electronic selectors, a plurality of groups of electron tubes, each group of electron tubes connected individually to a particular line circuit, corresponding tubes of each group individually associated with a particular selector, a distributor for pre-selecting an idle selector and preparing the tubes associated with said idle selector for operation, and means operated by a completed one of said line circuits for operating said idle selector and the tube associated therewith for establishing a communication circuit.

6. In a telephone system, a first and second line circuit, a plurality of selectors, a first group of electron tubes individual to said first line circuit, each tube of said first group individually associated with a corresponding selector, a second group of electron tubes individual to said second line circuit, each tube of said second group individually associated with a corresponding selector of said group, means individually associated with each selector and automatically operated at a certain time when its associated selector is idle for preparing the tube of said first group associated with said idle selector, means operated on completion of said first line circuit for activating the associated prepare tube of said first group to establish a connection from said first line circuit to the idle selector associated with said activated tube, means associated with said connected selector and operated in response to the operation of said selector over said connection for signalling said second line circuit and for preparing the tube of said second group associated with said selector, and means operated on completion of said second line circuit for activating the prepared tube of said second group associated with said connected selector and said second line circuit to establish a connection from said second line circuit to said selector, whereby a communication circuit is established from said first line circuit to said second line circuit.

7. In a communication circuit, a first and second line circuit, a group of selectors, a first group of electron tubes individual to said first line circuit, each of said tubes individually associated with a corresponding selector, means for automatically selecting an idle selector of said group and for preparing the tube associated with said idle selector, means operated on completion of said first line circuit for activating said prepared tube associated with said idle selector for establishing a connection from said first line circuit to said idle selector and thereafter operated for operating said selector to connect to and signal said second line circuit, a second group of electron tubes individual to said second line circuit, said second group of tubes having a tube individually associated with said idle selector, and means thereafter operated on completion of said second line circuit for operating said idle selector to actuate the tube of said second group associated with said idle selector for establishing a connection from said idle selector to said second line circuit, whereby a communication circuit is established between said first and second line circuits through the activated tubes.

8. In a telephone system, a calling line circuit, a group of selectors, an electron tube matrix interconnecting said calling line circuit and said selectors, a distributor preselecting an idle selector of said group, means operated on completion of said calling line circuit for operating a tube in said matrix for establishing a connection to said selected idle selector, means in said calling line circuit for transmitting digital impulses over the established connection for operating said selected idle selector, a called line circuit connected to said matrix, a marker operated by said selector in accordance with said transmitted digital impulses received by said selected idle selector for seizing the called line circuit, and means in said second line circuit for operating a tube in said matrix for establishing a connection to said selected idle selector, whereby a communication circuit is established betwen said first and second line circuits through said selected idle selector and said matrix.

9. In a telephone system, a calling line circuit, a group of electronic selectors, a gas-tube matrix interconnecting said calling line circuit and said selectors, a distributor pre-selecting an idle selector of said group, means operated on completion of said calling line circuit for operating a gas-tube of said matrix to establish a connection to said selected idle selector, means in said calling line circuit transmitting impulses over the established connection for operating said line selector, a called line circuit connected to said gas-tube matrix, a marker operated by said selector in accordance with said transmitted digital impulses for seizing said called line circuit, and means operated on closure of said called line circuit for operating a gas-tube in said matrix for establishing a connection to said selected idle selector from said called line circuit, whereby a communication circuit is established between said called and calling line circuits through the operated tubes.

10. In a telephone system, a calling line circuit, a group of electronic selectors, a distributor, means for operating said distributor for pre-selecting an idle selector of said group, a plurality of electron tubes directly connected to said calling line circuit and each individually connected to corresponding selectors including said preselected idle selector, means operated by said distributor and said preselected idle selector for preparing an individually corresponding first tube connected thereto to enable a connection to be established through said first tube, means operated on closure of said calling line circuit for establishing a connection to said pre-selected idle selector accordingly from said calling line circuit and through said first tube, means in said calling line circuit for transmitting digital impulses over the established connection for operating said selected idle selector, a called line circuit, a marker operated by said selector in accordance with said transmitted digital impulses for seizing said called line circuit, a second electron tube directly connected to said called line circuit and said pre-selected idle selector, and means operated on closure of said called line circuit for establishing a connection to said selected idle selector through said second tube, whereby a communication circuit is established from said calling line circuit to said called line circuit through said first and second tube.

11. In a telephone system, a calling line circuit, a group of electronic selectors, a first group of gas-tubes common to said calling line circuit, each of said first tubes individually associated with a particular selector of said group, a distributor pre-selecting an idle selector of said group, means in said calling circuit for operating one gas-tube of said first group associated with said idle selected selector for establishing a connection to said selected idle selector from said calling line circuit and through said tube, means in said calling line circuit for transmitting impulses over the established connection for operating said selected idle selector, a called line circuit, a second group of gas-filled tubes common to said second line circuit, each of said second tubes individually associated with a particular selector of said group, a marker, means for associating said marker with said selected selector, said marker operated by said selected idle selector in accordance with said transmitted digital impulses for seizing said second line circuit, and means operated on completion of said second line circuit for operating a gas-tube of said second group associated with said selected idle selector to establish a connection to said selected idle selector, whereby a communication circuit is established between said called and calling line circuits through the operated tubes.

12. An electronic distributor adapted for use in a communication system having a number of idle and busy selectors for pre-selecting an idle selector comprising a first plurality of electronic tubes, a ring counting circuit interconnecting said first tubes whereby only one of said first tubes operates at a time, a second plurality of tubes, each of said second plurality of tubes individually associated with one of said first plurality of tubes and a particular selector, a circuit interconnecting associated ones of said first and second tubes to prepare said second tubes for operation on operation of an associated first tube, a plurality of selector testing circuits, each individually interconnecting one of said second tubes and its particular selector for operating one of said second tubes if said particular selector is busy and an associated first tube is operated for preparing its associated second tube, and a pulsing circuit operated by said operated second tube for pulsing said ring counting circuit to operate the succeeding first tube.

13. An electronic distributor adapted for use in a communication system having a number of idle selectors and busy selectors for pre-selecting an idle selector comprising a first plurality of electron tubes, a ring counting circuit interconnecting said first tubes, whereby only one of said first tubes operates at a time, a second plurality of tubes, each of said second tubes individually associated with one of said first tubes and a particular selector, a circuit interconnecting associated ones of said first and second tubes to prepare said second tubes for operation an operation of an associated first tube, a selector testing circuit for operating one of said second tubes if its particular selector is busy and its associated first tube is operated, and a pulsing circuit for operated by said operated second tube for pulsing said ring counting circuit to operate the succeeding first tube.

14. An electronic distributor adapted for use in preselecting an idle selector comprising an electronic ring counting circuit having counting tubes therein, whereby said counting tubes are operated successively, a selector testing circuit having testing electron tubes therein, each of said testing tubes individually associated with one of said counting tubes and a particular selector, one of said testing tubes prepared for operation by its operated associated counting tube and operated by a particular busy selector, and a pulsing circuit operated by an operated testing tube for operating the succeeding counting tube.

15. In a telephone system, a plurality of selectors, a ring counting circuit having counting electron tubes therein arranged to operate successively, each of said counting tubes associated with a particular selector, a selector testing circuit having testing electron tubes therein prepared for operation by an operated counting tube, each of said testing tubes individually connected to one of said counting tubes and a particular selector, means for operating one of said testing tubes if its associated counting tube is operated and its associated selector is busy, a pulsing circuit operated by said operated testing tube for pulsing said counting circuit to operate the succeeding counting tube, an electron tube matrix, and an outgoing circuit having electron tubes therein individually associated with tubes of said matrix and operated by an operated counting tube if its associated tube remains unoperated for preparing an associated matrix tube for operation.

16. In a telephone system, a plurality of line circuits, a plurality of selectors, a plurality of electron tubes, each of said electron tubes individually associated with a line circuit, means for preparing the electron tube associated with a completed line circuit, and means operated if all said selectors are busy for operating and transmitting an all-selector-busy signal through said prepared electron tube to said completed line circuit.

17. In a telephone system, a plurality of line circuits, means for completing one of said line circuits, a normally operated relay associated with said line circuits, a plurality of selectors, a circuit means operated if all of said selectors are busy for releasing the normally operated relay associated with said line circuits, a plurality of gas-tubes, each of said gas-tubes individually associated with a line circuit, circuit means completed on the releasing of said normally operated relay for operating the gas-tube associated with said completed line circuit, and means operated on the operation of said operated gas-tube for transmitting an all-selector-busy signal therethrough to said operated line circuit.

18. In a telephone system having lines from which calls may be made or to which calls may be made, a coordinate array of tubes, said tubes being cold cathode gaseous tubes having a cathode, an anode and a starter anode, each of said lines associated with the cathodes in two of the rows of said array, a plurality of selectors, each of said selectors associated with the anodes in one of the columns of said array, a distributor, said distributor associated with said selectors and the starter anodes of the first of each of said pair of rows in said array, means in each of said selectors for marking in said distributor when one of said selectors is idle, means in said distributor operated by said marking of one of said selectors as idle for applying a starting voltage to the starter anodes of the first of each pair of rows and in the column of said array associated with the idle selector for preconditioning the tubes in that column for conduction, means in each of said selectors operated by conduction through one of the tubes in the first of said rows of each pair of said rows associated with one of said lines and in the column of said array associated with one of the selectors for seizing said one of the selectors, means associated with each of said lines operated when a call is made from one of said lines for applying a firing voltage to the cathode of the tube of the first row of the pair of rows associated with the calling line and in the column associated with an idle selector for causing conduction in said tube whereby said selector is seized by said calling line.

19. In a system as claimed in claim 18, means for transmitting impulses through said conducting tube of said array for operating said seized selector to select a called line, means associated with said seized selector operated on selection of a called line by said selector for marking said called line and means associated with a called line and the selector which selected and marked the called line for completing a talking circuit from said called line through a tube of the second row of the pair of rows associated with the called line and in the column of said array associated with said seized selector and through said seized selector and through said conducting tube to said calling line.

20. In a telephone system, a coordinate array of tubes, said tubes being cold cathode gaseous tubes having a cathode, an anode and a starter anode, a plurality of lines, each of said lines associated with the cathodes in one of the rows of said array, a plurality of selectors, each of said selectors associated with the anodes in one of the columns of said array, a distributor, said distributor associated with said selectors, means in each of said selectors for marking in said distributor when one of said selectors is idle, starter anode circuits connected to each of said starter anodes and to means in said distributor, said means in said distributor operated by said marking of one of said idle selectors for applying a starting voltage to the starter anodes of said tubes in the column of said array associated with the idle selector for conditioning the tubes in that column for conduction, means in each of said selectors operated by conduction through one of the tubes in the column associated with one of the selectors for seizing said one of the selectors, means associated with each of said lines for applying a firing voltage to the cathodes of the tubes of the row associated with the line, means associated with each of said lines for operating said last mentioned means whereby the operation of said last mentioned means causes conduction in the tube in the row associated with said last mentioned means and in the column associated with an idle selector whereby said selector is seized.

21. In a telephone system having a selector which selects a called line from a group of lines by means of a group of stored coded voltages, a marker, for marking and testing a called line of a group of lines, comprising a group of cold cathode gaseous tubes each having a cathode, an anode and a starter anode, circuits associated with said selector for applying stored coded voltages to said starter anodes, a group of relays having relay contacts, a group of circuits, each circuit individually connected from one of said lines to different ones of said relay contacts, means for testing the condition of a called line, another group of circuits, an operating circuit for each of said relays, each of said operating circuits comprising the anode of one of said tubes, one of said relays, a source of power and the cathode of said one of said tubes, the voltages applied to said starter anodes of said tubes for operating different ones of said tubes in accordance with said stored coded voltages to thereby conduct current for operating different ones of said relays in accordance with said stored coded voltages to thereby connect a certain circuit of said other circuits to said means for testing the condition of said line and to one of said first group of circuits at said contacts for enabling said testing means to determine the condition of a selected line.

22. In a telephone system, a group of selectors, a line, a row of cold cathode gaseous tubes, each of said tubes having a cathode, an anode and a starter anode, means for connecting line to all the cathodes of said tubes simultaneously, each of the anodes of said tubes connected to a source of power in one of said selectors, means in each of said selectors for causing a seizure of its selector when the tube connected to said power source in that selector is conducting, each of said tubes having the electrical characteristic of requiring a certain voltage between said cathode and said starter anode to cause conduction of current between said cathode and said anode, a distributor for preparing one of said selectors for seizure, said distributor comprising a second row of cold cathode gaseous tubes, each tube of said second row of tubes associated with a corresponding selector, operating circuits for each of said second row of tubes including the anode and cathode thereof, each of said operating circuits including a cathode resistor in series therein and connected to said cathode, means in said distributor for completing any one of said operating circuits to cause one tube associated with said prepared selector of said second row of tubes to conduct current whereby a voltage appears across said cathode resistor of said conducting tube, each of said cathode resistors connected to a corresponding one of said starter anodes of said first row of tubes whereby the voltage appearing across the cathode resistor of said conducting tube of said second row of tubes is applied to one of said starter anodes of said first row of tubes, and a voltage connected to said line so that when said line is connected to said cathodes of said first row of tubes said required certain voltage is applied between said cathode and said starter anode of one of said tubes of said first row which is connected to said cathode resistor having a voltage appearing thereacross to cause conduction between said cathode and said anode of said tube of said first row for operating said selector seizing means to cause a seizure of said prepared selector associated with said anode of said conducting tube of said first row.

23. In a communication system having a calling line and a called line and a group of selectors some of which may be busy and others idle, means for completing a circuit over said calling line on initiation of a call from said calling line, a co-ordinate electronic tube arrangement, certain tubes of each column in said arrangement individually associated with a selector for extending a connection from a calling line, other tubes in each column individually associated with a selector for extending a connection from said selector to said called line, a distributor for preselecting an idle selector comprising a counting circuit, and a plurality of electronic testing tubes, each individually associated with one of said electronic selectors, said electronic testing tubes successively prepared for conduction by said counting circuit, means in each of said selectors operated if said selector is busy for rendering its associated electronic testing tube conductive if said tube has been prepared by said counting circuit, a pulsing circuit in said distributor completed if said testing tube is rendered conductive for advancing said counting circuit for preparing a succeeding testing tube, another plurality of electronic tubes in said distributor individually associated with one of said testing tubes and with said certain tubes in said column, one of said last other tubes rendered conductive if its associated testing tube has been prepared by said counting circuit but has not been rendered conductive by said selector means for preparing said certain tubes of said arrangement associated with said selector which has not rendered conductive its associated testing tube, means operated by said first completed circuit over said calling line on initiation of a call for rendering conductive one of said certain tubes in said co-ordinate arrangement in the column of tubes prepared by said last other conductive tube for extending a connection through said certain tube of said arrangement to said selector, the busy means in said selector operated by said connection for rendering conductive its associated electronic testing tube in said distributor for completing said pulsing circuit to thereby advance said counting circuit to prepare a succeeding testing tube, a plurality of storing circuits in said selector, a pulsing circuit in said selector, said last pulsing circuit controlled by digital impulses transmitted through said conductive tube of said arrangement for storing digital impulses in one of said selector storing circuits, means operated after a series of transmitted pulses have been received for enabling said pulsing circuit to control another of said selector storing circuits, said storing circuits storing said transmitted digital pulses in accordance with a code, means operated after a predetermined number of transmitted series of pulses, a marker for decoding said stored digital pulses associated with said selector storing circuits by said operated last means, a plurality of means in said marker operated by said storing circuits in accordance with said coded digital impulses, and means associated with a called line operated if said last means are operated in accordance with the digital impulses corresponding to said called line for rendering conductive one of said other tubes of said arrangement associated with said selector to thereby establish a connection from said calling line through said conductive certain tube of said arrangement, through said selector and through said conductive other tube of said arrangement to said called line.

24. In a system such as claimed in claim 23, means operated on completion of said connection for thereafter preventing the transmission of any further pulses to said storage devices.

25. In a system such as claimed in claim 23, means associated with each line for producing a particular potential when its associated line is busy, and means in said marker operated by said potential in case the called line is busy for releasing said selector.

26. In a system such as claimed in claim 23, means operated if said called line is idle for signalling said called line.

27. In a communication system having a calling line and a called line and a group of selectors some of which may be busy and others idle, means for completing a circuit over said calling line on initiation of a call from said calling line, a co-ordinate electronic tube arrangement, certain tubes of each column in said arrangement individually associated with one of said selectors for extending a connection from a calling line, other tubes in each column individually associated with one selector for extending a connection from said selector to said called line, a distributor for preselecting an idle selector comprising a counting circuit, a plurality of electronic testing tubes, each individually associated with one of said electronic selectors, said electronic testing tubes successively prepared for conduction by said counting circuit, means in each of said selectors operated if said selector is busy for rendering its associated electronic testing tube conductive if said tube has been prepared by said counting circuit, a pulsing circuit completed if said testing tube is rendered conductive for advancing said counting circuit for preparing a succeeding testing tube, another plurality of electronic tubes in said distributor individually associated with one of said testing tubes and with said certain tubes in said column, one of said last other tubes rendered conductive if its associated testing tube has been prepared by said counting circuit but has not been rendered conductive by said selector means for preparing said certain tubes of said arrangement associated with said selector which has not rendered conductive its associated testing tube, a relay operated by said first completed circuit over said calling line on initiation of a call, means operated by said relay for rendering conductive said tube in said co-ordinate arrangement in the column of tubes prepared by said last other conductive tube for extending a connection through said tube to said selector, the busy means in said selector operated by said connection for rendering conductive its associated electronic testing tube in said distributor for completing said pulsing circuit for advancing said counting circuit to prepare a succeeding testing tube, a plurality of storing circuits in said selector for storing digits in a binary sequence, a pulsing circuit in said selector, said pulsing circuit operated in accordance with digital pulses transmitted through said conductive tube for storing the corresponding digit in one of said selector storing circuits, means operated after one series of transmitted pulses for enabling said pulsing circuit to control another of said selector storing circuits, means including part of said enabling means operated after a predetermined number of transmitted series of pulses, a marker for decoding said stored binary sequence digits into a decimal equivalent associated with said selector storing circuits by said operated last means, a plurality of means in said marker operated by said storing circuits in accordance with said coded digits, and means associated with a called line operated if said last means are operated in accordance with the digits corresponding to said called line for rendering conductive one of said other tubes of said arrangement associated with said selector to thereby establish a connection from said calling line through said operated certain tube of said arrangement, through said selector and through said conductive other tube of said arrangement to said called line.

28. In a system such as claimed in claim 27, means in each of said selectors operated by an associated busy means for setting said storing circuits.

29. A system such as claimed in claim 27 in which said selector pulsing circuit includes a cathode follower tube arrangement for reproducing said pulses for operating said storing means and also for operating said means for enabling said pulsing circuit to operate another of said selector storing circuits.

30. A system such as claimed in claim 29 in which said means for enabling said pulsing circuit to operate another of said selector storing circuits comprises another tube and a unidirection circuit interconnecting said cathode follower tube arrangement and said other tube, means operated if said other tube is rendered conductive by a voltage of a predetermined value appearing across said unidirection circuit, and means for operation by said other tube, said last means operated on subsequent non-conduction of said tube for enabling said pulsing circuit to operate another of said storing circuits.

31. A system such as claimed in claim 30 in which said enabling means includes means operated after said last tube has been rendered conductive and non-conductive a predetermined number of times for operating said means for associating said marker with said operated selector storing circuits.

32. In a communication system having an electron tube matrix and a first group of circuits each individually associated with a row of tubes of said matrix, means for completing one of said circuits, a second group of circuits each individually associated with a column of tubes of said matrix, a sequentially operating circuit, means operated by said sequentially operating circuit for selecting only one of said second group of circuits and preparing only the tubes in the column associated therewith for operation, means operated on selecting of one of said second circuits for terminating the operation of said sequentially operating circuit, the one of said first group of circuits completed by said first means rendering conductive the tube in the row associated therewith and in the column associated with said selected one circuit of said second group of circuits for extending a connection from said one circuit of said first group to said selected circuit of said second group, and means operated on completion of said connection for enabling operation of said sequentially operating circuit.

33. In a communication system having an electron tube matrix and a first group of circuits each individually associated with a row of tubes of said matrix, means for completing one of said circuits, a second group of circuits each individually associated with a column of tubes of said matrix, means for automatically selecting one of said circuits of said second group, a plurality of D. C. sources of potential, each source individually associated with one circuit of said second group of circuits, means operated by said selected circuit of said second group of circuits for applying its associated D. C. source of potential to said associated column of tubes for preparing the tubes in the column for conduction, a plurality of other D. C. sources of potential, each of said other sources individually associated with one of said first circuits, means for applying one of said other sources to the row of tubes associated with its associated first circuit on completion of said first circuit for rendering conductive a tube in the row of tubes which has been prepared by said first D. C. source of potential applied to said column of tubes to establish a connection from said completed first circuit, through said conductive tube to said selected second circuit, and means operated on establishment of said connection for operating said selecting means to select another of said second circuits and for thereby applying one of said first D. C. sources associated with said other selected circuit to the column of tubes associated with said selected circuit.

34. In a system as claimed in claim 33, a third plurality of D. C. sources of potential, each individually associated with one of said second circuits and a plurality of circuits each individually interconnecting one of said third D. C. sources and a column of tubes associated with its associated second circuit.

35. An electronic distributor adapted for use in a communication system having calling lines and a group of selectors associated with said calling lines and adapted to be sized individually thereby, and means in each of said selectors operated on seizure by a calling line, said distributor comprising an electronic ring counting circuit, a plurality of electronic selector testing circuits, each testing circuit individually associated with one of said selectors and each circuit successively prepared for completion by said ring counting circuit and each testing circuit completed only by the operated means in its associated selector and a pulsing circuit completed by a completed selector testing circuit for pulsing said ring counting circuit to thereby prepare a successive selector testing circuit.

36. An electronic distributor adapted for use in a communication system having calling lines and a group of selectors associated with said calling lines and means in each of said selectors operated on seizure of that selector by a calling line, said distributor comprising an electronic ring counting circuit, a plurality of electronic selector testing circuits, each individually associated with one of said selectors, each testing circuit successively prepared by said counting circuit and completed only if said means in said associated selector is operated, a pulsing circuit completed by a completed selector testing circuit, a plurality of outgoing circuits each individually associated with one of said testing circuits and completed if said associated test circuit is prepared by said counting circuit but unoperated by said means, and means operated by said completed last circuit for enabling one of said calling lines to establish a connection to said selector having said unoperated means.

37. A telephone system comprising a plurality of subscriber lines, a plurality of line circuits each connected to one of said lines, a plurality of electronic valves through which individual conversational and control paths are extended on the conditioning of said valves, a number storage device, means responsive to the conditioning of one of said valves for connecting one of said line circuits to said device through said valve, means responsive to the transmission of impulses representing a number over the subscriber line connected to said line circuit for causing said storage device to store said number, and means thereafter effective for completing a conversational path from said one line circuit through said one valve to the line circuit of a called line.

38. In a telecommunication system, a switching arrangement comprising input paths to said switching arrangement, output paths from said switching arrangement, a plurality of electronic valves arranged in groups some of which groups are individually associated with said input paths and some of which groups are individually associated with said output paths, each input path communicating with an output path over the discharge paths of one valve in a group individual to the input path and one valve in a group individual to the output path, control means for applying a first potential to one valve in a group individual to the input path, and control means controlled over said input path and said one valve for applying a second potential to another valve in a group individual to an output path, both said valves in said groups striking to complete a connection between an input path and an output path through said valves.

39. In a telephone system, a plurality of subscriber lines, switching means comprising a plurality of gaseous discharge tubes arranged in groups, circuit means including the discharge paths of said tubes and constituting individual conversational and control signal paths for completing connections to a called subscriber line, means individual to a group of tubes and automatically operated for storing the number of a called subscriber line on the dialling of said number at a calling line, said means serving to apply a bias potential to corresponding electrodes of all the discharge tubes in its individual group and to control the application of another potential to other corresponding electrodes of the tubes in a group determined by said number, one of the tubes of the group determined by said number being in the group individual to said means whereby only that tube is struck in response to the concurrent application of said bias potential and said other potential thereto to complete a connection to a called subscriber line.

40. A telephone system comprising a plurality of subscriber lines, a first plurality of gaseous discharge tubes individual to each line, a second plurality of gaseous discharge tubes individual to each line, means for successively triggering one tube of said first plurality of tubes and one of said second plurality of tubes to complete through said triggered tubes a connection between a calling and a called line, means responsive to the triggering of said one tube of said first plurality for thereafter preventing the triggering of any tubes of the plurality individual to the calling line, and means responsive to the triggering of said one tube of said second plurality of tubes for thereafter preventing the triggering of any tube individual to the called line.

References Cited in the file of this patent

UNITED STATES PATENTS

| | | |
|---|---|---|
| 2,139,655 | Allensworth | Dec. 13, 1938 |
| 2,285,972 | Holden et al. | June 9, 1942 |
| 2,291,752 | Parker | Aug. 4, 1942 |
| 2,298,699 | Hubbard | Oct. 13, 1942 |
| 2,409,586 | Powell | Oct. 15, 1946 |
| 2,518,022 | Keister | Aug. 8, 1950 |
| 2,542,672 | Hecht | Feb. 20, 1951 |
| 2,543,534 | Powell | Feb. 27, 1951 |
| 2,629,021 | Robertson et al. | Feb. 17, 1953 |
| 2,684,405 | Bruce et al. | July 20, 1954 |